Patented May 16, 1933

1,909,070

UNITED STATES PATENT OFFICE

ROSALIE M. PARR, OF URBANA, ILLINOIS, ASSIGNOR TO ABBOTT LABORATORIES, OF NORTH CHICAGO, ILLINOIS, A CORPORATON OF ILLINOIS

REMEDY FOR ANEMIA

No Drawing.    Application filed March 9, 1929. Serial No. 345,885.

The invention relates to improvements in the manufacture of remedies for anemia or analogous diseases and is a result of the preparation of various rare element compounds and an investigation of their therapeutic properties.

The use of compounds of the rare and somewhat recently discovered metal germanium has been advocated by a number of investigators who published their suggestions several years ago. However, later investigators and writers were unable to see or develop any substantial benefit in the therapeutic use of germanium as an erythropoietic agent.

Although I have been unable to definitely determine the reasons for the wide discrepancy in the results obtained by these prior experimenters in this field, I believe that I have discovered that a germanium compound when used in its chemically pure state is unsafe, unsuitable, or inefficient for the treatment of anemia, and it is only when mixed or combined with other compounds that it becomes of substantial therapeutic value.

I have found that when combined with other ingredients or compounds, the germanium compound preferably should be in the form of a salt of one or more of the alkaline metals, for example, sodium, potassium or lithium as representing the alkali metals and calcium, magnesium, or strontium, representing the alkaline earth metals.

The rarer metal compounds which I successfully used in combination with the germanium compounds themselves are similar salts of elements belonging to the sulphur B series in the sixth group of the periodic table, for example, tellurium and particularly selenium.

The compound with which I have secured good results is probably a mixture of the sodium and calcium salts of germanium, tellurium, and selenium in the presence of sodium chloride or sodium citrate. The sodium chloride solution of the material may be prepared as follows:

50 cc. of .5 normal NaOH are evaporated to dryness in a Pyrex beaker and then baked for one-half hour at 400° C. 1 gram of $GeO_2$ is added while the alkali is hot and the baking is continued at 400° C. for five minutes, after which the material is cooled.

To the cooled material, there is added 5 cc. of water and the temperature is raised to the boiling point. Then another 10 cc. of water is added and the material is boiled a second time. The contents of the beaker are then shaken up and 20 cc. of water is added and boiled. Water is then added in small volumes each time bringing to the boiling point until finally two liters are added. Keep boiling, adding more water occasionally to maintain a volume of about one liter as evaporation takes place. This step of the process should continue for five or six hours. It is now necessary to remove any $CO_2$ which may have been picked up from the air. To do this, add 6 cc. of a 1% solution of $CaCl_2$. Boil and allow to settle. Filter and dissolve the precipitate ($CaCO_3$) in HCl about .5 normal which is measured from a burette so that just enough HCl is used to dissolve the precipitate. Allow the dissolved precipitate to return to the main solution. When the dissolved precipitate returns to the main solution, a new precipitate ($CaCO_3$) forms. This is filtered and again dissolved with HCl to remove the $CO_2$, being a repetition of the previous step which is also repeated several times in order to effect thorough removal of $CO_2$.

After the $CO_2$ has been removed, there is added 8 cc. of 1% $NH_4Cl$ and the liquid is brought to a boil. Any residue filtered out will now dissolve in HCl. There is now added to the solution 2 cc. of selenious acid ($H_2SeO_3$) (.002 g. per cc.). Also, there is added .1 cc. of potassium tellurite $K_2TeO_3$ (¼ mol per liter) and two grams of NaCl. The solution is then boiled and evaporated to 500 cc., placed in tubes or ampules and sterilized at 15 or 20 pounds per square inch steam pressure for about 15 minutes.

The completed product thus prepared is ready for use and is probably a mixture of sodium germanate either $NaHGeO_3$ or $Na_2GeO_3$, or both, sodium tellurite $Na_2TeO_3$, sodium selenite $Na_2SeO_3$ together with similar calcium and ammonium salts and chlorides of sodium, germanium and tellurium.

This medicine is taken orally, the dose being about 6 cc. three times a day on an empty stomach for one day in each five days.

The material as prepared above has been successfully employed in the treatment of both primary and secondary types of anemia and permanent cures have been effected in some cases without the necessity of repeating the treatment.

The scope of the invention should be determined by reference to the appended claims, said claims to be construed as broadly as possible consistent with the state of the art.

I claim as my invention:

1. As a medicament for treating anemia, a material which includes the sodium and calcium salts of germanium and selenium.

2. A medicament for treating anemia which contains a salt of germanium together with a minute portion of a salt of a rare element of the sulphur B series, said salts being of a metal of the group consisting of alkali metals and alkaline earth metals.

3. A medicament for treating anemia which comprises an alkali metal salt of germanium and an alkali metal salt of selenium, the quantity of the latter salt being relatively minute as compared to that of said germanium salt.

4. As a medicament for treating anemia, a material which includes germanium and tellurium salts of metals of the group consisting of alkali metals and alkaline earth metals.

5. A medicament for treating anemia which comprises an alkali metal salt of germanium and an alkali metal salt of tellurium, the quantity of the latter salt being relatively minute as compared to that of said germanium salt.

6. As a medicament for treating anemia, a material which contains salts of germanium, selenium and tellurium, said salts being of metals of the group consisting of alkali metals and alkaline earth metals.

7. As a medicament for treating anemia, a material which contains alkali salts of germanium, selenium and tellurium.

8. As a medicament for treating anemia, a material which contains alkaline earth salts and germanium, selenium and tellurium.

9. A medicament valuable for use in the treatment of anemia, comprising a salt of germanium and a salt of an element of the sulphur B series, said salts each being of a metal of the group consisting of alkali metals and alkaline earth metals.

10. A medicament especially suitable for treating anemia which comprises an alkali metal salt of germanium and an alkali metal salt of a metal of the sulphur B series, the quantity of the latter salt being relatively minute as compared to that of said germanium salt.

11. A medicament of the class described, comprising ammonium salts of germanium and of an element of the sulphur B series.

12. A medicament of the class described, comprising ammonium salts of germanium, selenium and tellurium.

ROSALIE M. PARR.

CERTIFICATE OF CORRECTION.

Patent No. 1,909,070. May 16, 1933.

ROSALIE M. PARR.

It is hereby certified that error appears in the printed specification of the above numbered patent requiring correction as follows: Page 2, line 61, claim 8, for "and" first occurrence, read "of"; and that the said Letters Patent should be read with this correction therein that the same may conform to the record of the case in the Patent Office.

Signed and sealed this 27th day of June, A. D. 1933.

M. J. Moore.

(Seal) Acting Commissioner of Patents.